United States Patent [19]

Jiles

[11] 3,899,935

[45] Aug. 19, 1975

[54] TRANSMISSION CONTROL APPARATUS FOR A VEHICLE OR THE LIKE

[76] Inventor: Overton Jackson Jiles, 5250 Auburn Folsom Rd., Loomis, Calif. 95650

[22] Filed: Dec. 28, 1973

[21] Appl. No.: 429,190

[52] U.S. Cl. ............... 74/473 R; 180/95; 293/2
[51] Int. Cl.² ............... B60K 20/00; B60R 21/02
[58] Field of Search ........... 74/473 R; 180/82 A, 91, 180/92, 93, 94, 95, 96, 97; 293/2, 3, 4, 5, 6, 7, 8

[56] References Cited
UNITED STATES PATENTS

| 1,106,445 | 8/1914 | Fidler et al. | 180/92 |
| 1,123,538 | 1/1915 | Imamura | 180/95 |
| 2,902,105 | 9/1959 | Wiley et al. | 180/91 |
| 3,147,818 | 9/1964 | Howard et al. | 180/91 |
| 3,195,674 | 7/1965 | Schmidt | 180/92 |
| 3,738,441 | 6/1973 | Kemner | 180/91 X |

Primary Examiner—Samuel Scott
Assistant Examiner—John Reep
Attorney, Agent, or Firm—Mark C. Jacobs

[57] ABSTRACT

Transmission control apparatus for controlling the movement of the transmission of a vehicle between gears having a sensor bar pivotally connected to the vehicle and movable in a direction toward the vehicle upon impact with the bar. A cylinder having a piston therein is mounted on the vehicle and the piston is normally biased in a direction away from the controls for the gears of the transmission. A control cable is coupled to both the piston and the transmission controls and, upon movement of the bar upon impact, the piston is released to activate the cable to move the transmission gears between stop, forward and reverse positions, as desired.

13 Claims, 6 Drawing Figures 3,899,935

TRANSMISSION CONTROL APPARATUS FOR A VEHICLE OR THE LIKE

BACKGROUND OF THE INVENTION

1. Field of the Invention

The invention relates to safety apparatus; and more particularly, to a transmission reversing mechanism for automatically controlling the gears of the transmission of a vehicle, such as heavy construction equipment or the like, upon impact by the vehicle with a person or object or the like.

2. Description of the Prior Art

It is well known that many accidents involving vehicles or the like that strike a person or object in the path of the vehicle are complicated by the fact that the vehicle does not immediately stop upon impact and thus runs over or otherwise continues to roll over the person or object until the operator of the vehicle responds to the impact and sets the brake or otherwise renders the vehicle inoperative. This problem is especially acute in the heavy construction industry where visibility is a problem and the operator may not see a person or object in the path of the vehicle until it is too late, particularly when backing up.

Many devices and arrangements have been suggested in the past to alleviate this problem. However, these prior art systems have proven unsatisfactory, either from the standpoint of cost or efficiency after repeated use.

SUMMARY OF THE INVENTION

It is an object of this invention to provide apparatus for automatically reversing or stopping the transmission of a vehicle or the like upon impact thereof with a person or object. It is a further object of this invention to provide such apparatus which is set into play automatically and thus beyond the control of the operator. It is even another object to provide such apparatus which can be mounted on the rear end of the vehicle so that if the vehicle strikes such object or person when backing up, the direction of the vehicle is automatically reversed or stopped. It is still another object of this invention to carry out the foregoing objects in a relatively quick, efficient and inexpensive manner. These and other objects are preferably accomplished by providing apparatus on the vehicle having a sensor bar pivotally connected thereto and movable in a direction toward the vehicle upon impact with the bar. A cylinder having a piston therein is mounted on the vehicle and the piston is normally biased in a direction away from the controls for the gears of the transmission. A control cable is coupled to both the piston and the transmission controls and, upon movement of the sensor bar upon impact, the piston is released to activate the cable to move the transmission gears between stop, forward and reverse positions, as desired.

DESCRIPTION OF THE PREFERRED EMBODIMENT

Figure 1:
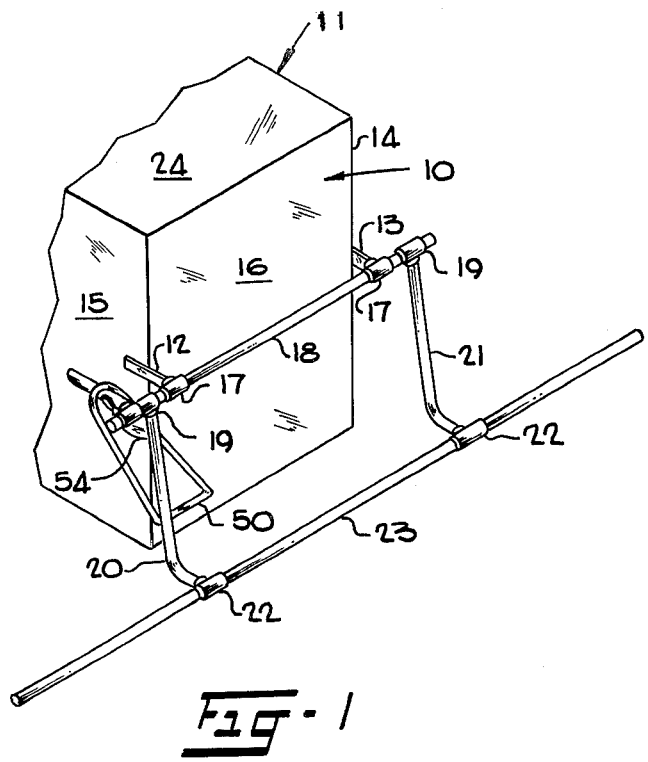
FIG. 1 is a perspective view of the rear end of a vehicle showing apparatus in accordance with my invention mounted thereon.

Referring now to FIG. 1 of the drawing, the rear end 10 of a vehicle 11, such as a tractor or similar heavy duty equipment, is shown. It is to be understood that my invention is directed to any suitable vehicles and, although it will be described hereinbelow with regard to the rear end of such equipment, obviously it can be mounted on the front end. However, since most accidents occur because the visibility of the operators of such equipment is generally completely obscured when backing up, it is particularly applicable to rear end mounting. Thus, if a person is bending over and not visible to the operator, the vehicle 11 of my invention will be automatically reversed upon impact with such person (or of course an object struck by the vehicle 11). Alternatively, it may be set to stop automatically upon impact, if desired.

Accordingly, a pair of mounting brackets 12, 13 are bolted or otherwise secured on opposite side walls 14, 15 of the rear end wall 16 of vehicle 11. These brackets 12, 13 extend outwardly generally horizontally from side walls 14, 15 (ie, generally parallel to the ground over which the vehicle 11 is travelling). Brackets 12, 13 may be adjustable in overall length, if desired, for varying the spacing thereof.

Each bracket 12, 13 carries a T-shaped joint 17 or the like at the free ends thereof. These joints 17 have their apertures aligned so that an elongated support bar 18 may be inserted into these apertures and fixedly secured thereto. Similar T-shaped joints 19 are carried by the free ends of support bar 18 outwardly of the first set of joints 17 as shown.

The ends of T-shaped joints 19 open downwardly for receiving thereto a pair of J-bars 20, 21 which may be welded therein. It can be seen in FIG. 1 that J-bars 20, 21 extend first downwardly, then curve outwardly away from the rear end 10 of vehicle 11 as shown. A pair of T-shaped joints 22 are carried by the free ends of J-bars 20, 21 and have their apertures generally coaxially aligned for receiving therein an elongated sensor bar 23. Bar 23 may be relatively long with respect to bar 18 as shown and may be telescoping in portions thereof for varying its overall length.

Figure 2:
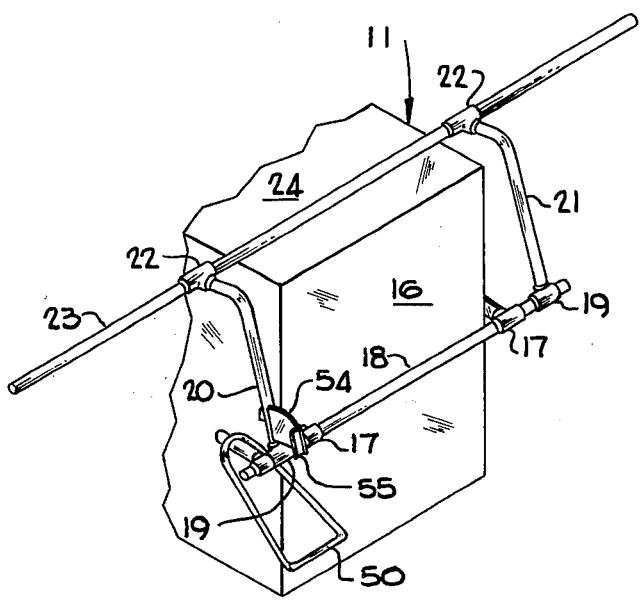
FIG. 2 is a view similar to FIG. 1 showing a portion of the apparatus of my invention in stowed position on the vehicle.

Bar 18 is freely rotatable with respect to joints 17 but may be welded to joints 19. Thus, as shown in FIG. 2, bar 18 may be pivoted or swung about joints 17 so that the sensor bar 23 carried thereby may be swung up and onto the top wall 24 of the rear end 10 of vehicle 11 and thus out of the way when the vehicle 11 is not in use or for highway travel or the like. Securing means — not shown — may be provided for holding the bar 23 in place. Alternatively, the sheer weight and balance of bar 23 may hold it in place.

Figure 3:
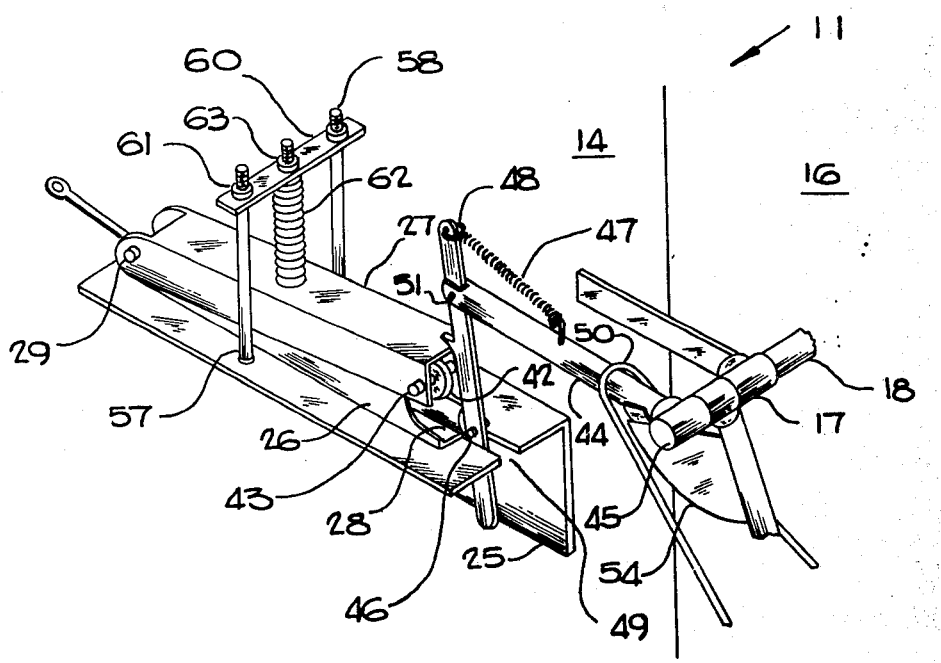
FIG. 3 is a perspective view of a portion of my apparatus.

Referring now to FIG. 3, an L-shaped bracket 25 may be mounted by any suitable means on one of the side walls of vehicle 11, such as side wall 14. A pair of generally U-shaped elongated housings 26, 27 are mounted on the upper surface of bracket 25. This is accomplished by mounting the base of one of the housings, such as housing 26, to the top of bracket 25 in any suitable manner. The other housing 27 has its base on the upper surface and may have its downwardly extending side walls outside of the side walls of housing 26 so as to form a channel 28 or the like inside the side walls of the inner housing 26 as shown. (Thus, housing 27 may be bigger than housing 26 to accomplish this telescoping relationship.) The rear end of upper housing 27 is pivotally connected, by a suitable nut-and-bolt arrangement 29 or the like, to the rear end of housing 26 so that it is movable upwardly with respect thereto.

Figure 4:
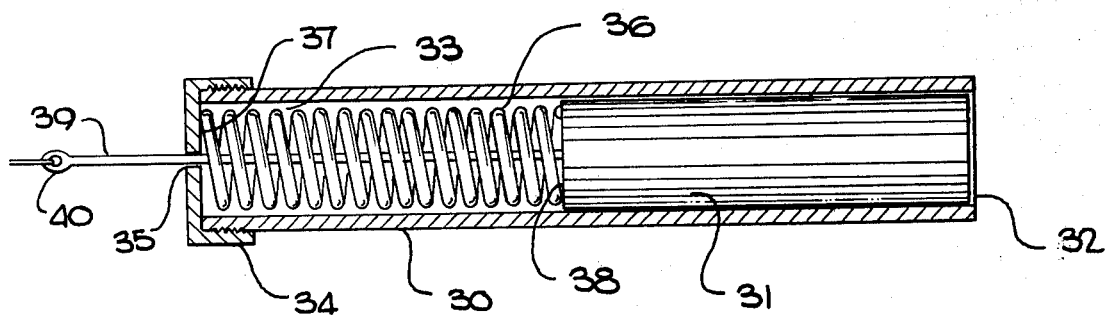
FIG. 4 is a vertical view of a portion of the apparatus of FIG. 3.

Referring now to FIG. 4, an elongated cylinder 30 is disposed within channel 28 (channel 28 being omitted in FIG. 4 for convenience of illustration). A piston 31 is slidably mounted within cylinder 30 and is prevented from exiting the forward end 32 thereby means to be described shortly. The rear end 33 of cylinder 30 is capped, as by a cap 34 threaded or the like thereon. Cap 34 has an aperture 35 or the like generally coaxially aligned with the longitudinal axis of cylinder 30. However, the exact location of aperture 35 is a matter of choice as will be discussed herein below.

A helical spring 36 is disposed in cylinder 30 between the end wall 37 of cap 34 and the rear face 38 of piston 31 as shown. Spring 36 is normally compressed within cylinder 30 and thus normally biases piston 31 out of the forward end 32 of cylinder 30. A control rod 39, of any siutable material, is secured at one end in any suitable manner to the rear face 38 of piston 31, then extends axially through spring 36 and out the aperture 35 in end cap 34 and may terminate in a ring-shaped portion 40. Thus, cable 39 may be fairly rigid and have a more flexible cable portion 41 secured to ring-shaped portion 40 and extending to the controls for the transmission of vehicle 11. Thus, the free end of cable portion 41, not visible in FIG. 4, extends to the means for shifting the vehicle transmission between its forward and reverse gears. The length of cable portion 41 is thus selected so that the shifting of cable 39 in a direction toward the forward end 32 of cylinder 30 moves the transmission controls between forward and rear gears and thus shifts vehicle 11 from a rearward direction to a forward direction as will be discussed further in detail hereinbelow. Of course, the controls may be set to stop vehicle 11, if desired.

Figure 5:
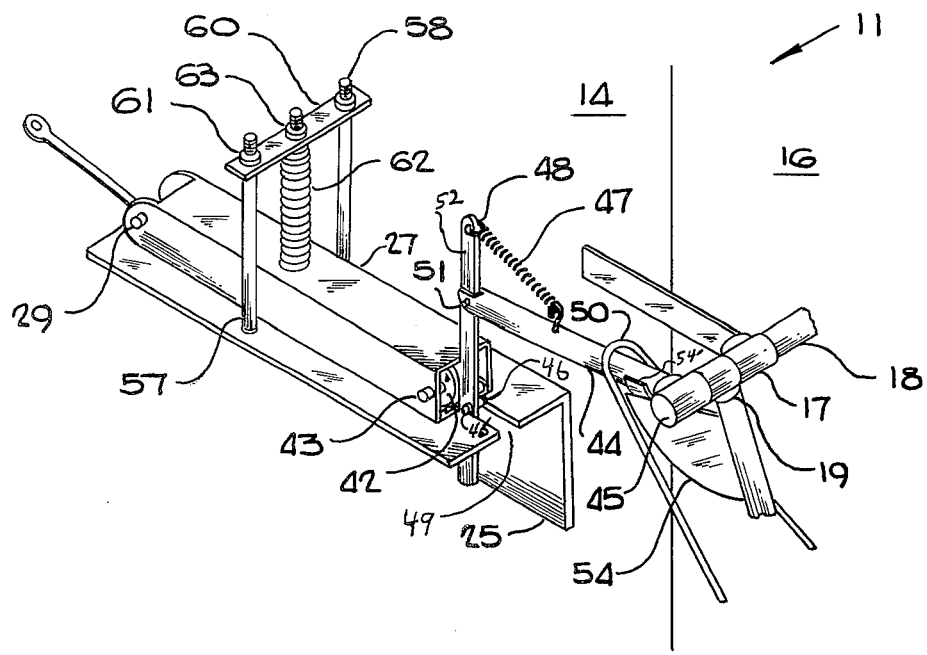
FIG. 5 is a view similar to FIG. 3 showing the operative position of that portion of the apparatus of my invention.

Referring once again to FIG. 3, a roller 42 is mounted between the downwardly extending side walls of upper housing 27 (see also FIG. 5). Roller 42 is adapted to rotate freely therein and is bolted or otherwise secured therein by bolts 43. An elongated trigger release arm 44 has one end thereof fixedly secured to a T-shaped joint 45 rotatably mounted on support bar 18 between joints 17 and 19 (see FIG. 1) and fixedly connected to joint 19 so as to be movable therewith. Arm 44 is guided within an O-ring 50 which is generally U-shaped when in position and under stress. O-ring 50 may be fixedly secured to the bottom of the rear end wall 16 of vehicle 11 as shown in FIG. 1.

Figure 6:
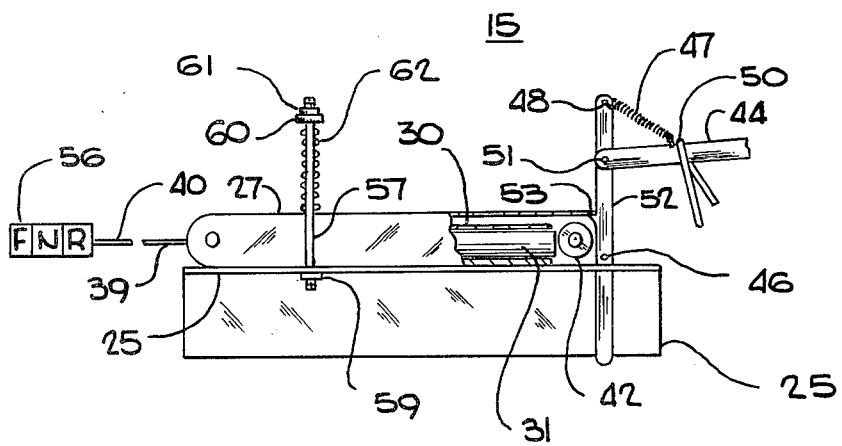
FIG. 6 is a side view, partly in section and partly diagrammatic, of a portion of the apparatus of my invention.

As shown more clearly in FIG. 6, the free end of release arm 44 is rigidly connected, as by bolts 51 or the like, to a release lever 52 which extends through a channel 49 formed in bracket 25. A vertical stop member 46 may be mounted on lever 52 (see also FIG. 5). A tensioning spring 47 may be secured at one end to arm 44 and at the other end within an aperture 48 at the top of lever 52 for tensioning the latching of lip portion 53.

A pair of spaced upright rods 57,58 may be bolted at one end, via nuts 59 or the like, (see FIG. 6) to suitable apertures in bracket 25. The free ends at the top of rods 57, 58 may be secured to suitable apertures in a transverse member 60 by nuts 61 or the like. A spring 62 may be disposed between rods 57,58 and extend between member 60 and be bolted thereto by nut 63 or the like and the upper surface of bracket 25 as shown in FIGS. 3 and 5 (spring 62 may be also secured thereto in any suitable manner). A bracket 54 may be secured to both bar 20 and bar 18 and includes an upwardly extending U-shaped member 54' for providing a downward stop for arm 44 (see FIG. 5).

In operation, the normal position of arm 44 and lever 52 is shown in FIGS. 3 and 6. Sensor bar 23 is in the FIG. 1 position. If bar 23 strikes a person or object with sufficient force to move bar 23 inwardly toward vehicle 11, the release arm 44 moves upwardly with respect to guide member 48 and against the action of spring 47. This also serves to move release lever 52 upwardly carrying housing 27 upwardly by means of the engagement of lip portion 53 with housing 27. This permits piston 31, normally biased outwardly of cylinder 30 via spring 36, to move past roller 42 to the position shown in FIG. 5. Since piston 31 is so moved, it pulls cable 39 and thus cable portion 40 in a direction away from vehicle 11 and thus moves the transmission control coupled thereto accordingly. This is shown diagrammatically in FIG. 6 wherein a transmission control panel 56 is shown which is mounted at a suitable location on vehicle 11 and has at least three positions for stopping vehicle 11 (N or Neutral position), driving vehicle 11 in at least one forward direction (F position), and reversing the direction of vehicle 11 (R position). Thus, this automatically reverses the direction of vehicle 11 preventing further damage as a result of its impact. Also, cable 39 and portion 40 may be set to stop vehicle 11, if desired. At the same time, springs 47 and 62 restore the housing 27 to the FIG. 3 position (pison 31 must, of course, be manually replaced in its operative position within cylinder 30). Stop member 46 and bracket 54 limit the movement of arm 44 and lever 52 as heretofore described.

It can be seen from the foregoing that I have described a spring loaded triggering device (i.e. piston 31) which may be coupled via cables or the like to the neutral, forward and reverse gears of a vehicle transmission and thus instantly changes the transmission from reverse to forward motion or from reverse or forward to neutral to prevent backing over a person or object struck by the sensor bar 23 and thus causing further damage.

The various bars and rods described hereinabove may be made in segments of unitary members, or of telescoping sections if desired. Thus, the invention is readily adaptable to equipment of various types and sizes. The amount of force necessary to activate the apparatus may be preset at any desired amount by selection of the proper springs, lengths of the various members, etc. Further, impact indicating means (not shown) may be coupled to the apparatus. For example, it may be coupled to a horn or light or the like which are activated upon impact. The apparatus disclosed herein is adaptable to any suitable equipment having forward and reverse gears and means for controlling the same. The various rods and bars may also be coated or otherwise covered with reflecting tape or paint or the like to render the apparatus more visible and apparent to an observer.

It is to be understood that various modifications and variations of the foregoing invention may occur to one skilled in the art and thus the scope of the invention is to be determined in view of the appended claims.

I claim as my invention:

1. Transmission control apparatus for the transmission of a vehicle or the like wherein said transmission is movable between gears and includes transmission control means for controlling said movement, said apparatus comprising:

a sensor bar pivotally connected to said vehicle and movable inwardly toward said vehicle;

cylinder housing means mounted on said vehicle, and housing a cylinder therein, said cylinder having a piston slideably mounted therein, wherein said housing means includes a bracket fixedly secured to said vehicle and a first housing fixedly secured to said bracket and a second housing telescopingly fitting with said first housing and pivotally connected thereto forming an elongated channel therebetween, said cylinder being mounted in said channel, said cylinder also having piston biasing means therein normally biasing said piston in a direction away from said transmission control means;

transmission movement means operatively connected to both said piston and said transmission control means for moving said transmission control means between its gears upon release of said piston from its normally biased position; and piston releasing means associated with both said housing means and said bar for releasing said piston from its normally biased position upon movement of said sensor bar.

2. The apparatus of claim 1 wherein said sensor bar is arcuately movable with respect to said vehicle from a first position in front of the vehicle to a second position on top of said vehicle.

3. The apparatus of claim 1 wherein said second housing is normally biased in a direction toward said bracket.

4. The apparatus of claim 1 wherein said piston releasing means includes a release arm fixedly connected to said sensor bar and movable therewith and a release lever fixedly connected to said release arm and movable therewith, and said release lever having a lip portion extending into abutting engagement with said second housing.

5. The apparatus of claim 4 wherein said piston releasing means further includes a roller carried by said second housing and rotable therein, said lip portion extending into said housing in a space formed between the upper inner surface of said housing and the top of said roller.

6. The apparatus of claim 4 wherein said release lever is normally biased in a direction toward said bracket.

7. The apparatus of claim 4 wherein said piston releasing means further includes a guide member operatively connected to said vehicle and in engagement with said release arm.

8. The apparatus of claim 7 wherein said guide member includes a generally U-shaped portion having spaced arms connected at one end to said vehicle and a bight portion integral with the other end of said arms surrounding said release arm.

9. The apparatus of claim 8 wherein said sensor bar is mounted at the rear end of said vehicle.

10. The apparatus of claim 1 wherein said second housing and said release lever are both normally biased in a direction toward said bracket.

11. The apparatus of claim 8 wherein said sensor bar is arcuately movable with respect to said vehicle from a first position in front of the vehicle to a second nonoperative position.

12. The apparatus of claim 1 wherein impact indication means are associated therewith, which means is activated upon impact of said sensor bar.

13. The apparatus of claim 1 wherein a sensor bar is mounted at least at the rear of said vehicle.

* * * * *